No. 746,423. PATENTED DEC. 8, 1903.
C. WELTER & T. GRENZSTEIN.
APPARATUS FOR AFFIXING POSTAGE STAMPS.
APPLICATION FILED DEC. 31, 1902.

NO MODEL. 2 SHEETS—SHEET 1.

No. 746,423. PATENTED DEC. 8, 1903.
C. WELTER & T. GRENZSTEIN.
APPARATUS FOR AFFIXING POSTAGE STAMPS.
APPLICATION FILED DEC. 31, 1902.
NO MODEL. 2 SHEETS—SHEET 2.

No. 746,423.

Patented December 8, 1903.

UNITED STATES PATENT OFFICE.

CARL WELTER AND THEODOR GRENZSTEIN, OF DUSSELDORF, GERMANY.

APPARATUS FOR AFFIXING POSTAGE-STAMPS.

SPECIFICATION forming part of Letters Patent No. 746,423, dated December 8, 1903.

Application filed December 31, 1902. Serial No. 137,370. (No model.)

*To all whom it may concern:*

Be it known that we, CARL WELTER and THEODOR GRENZSTEIN, both citizens of the German Empire, residing at Dusseldorf, Germany, have invented an Improved Apparatus for Affixing Postage-Stamps, of which the following is a specification.

Figure 1:
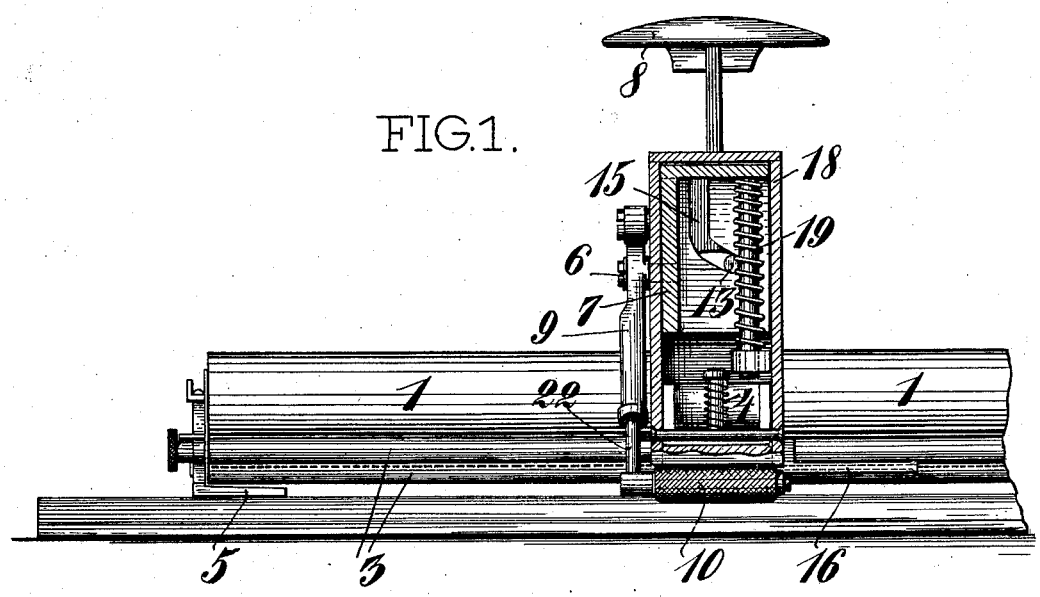
Figure 2:
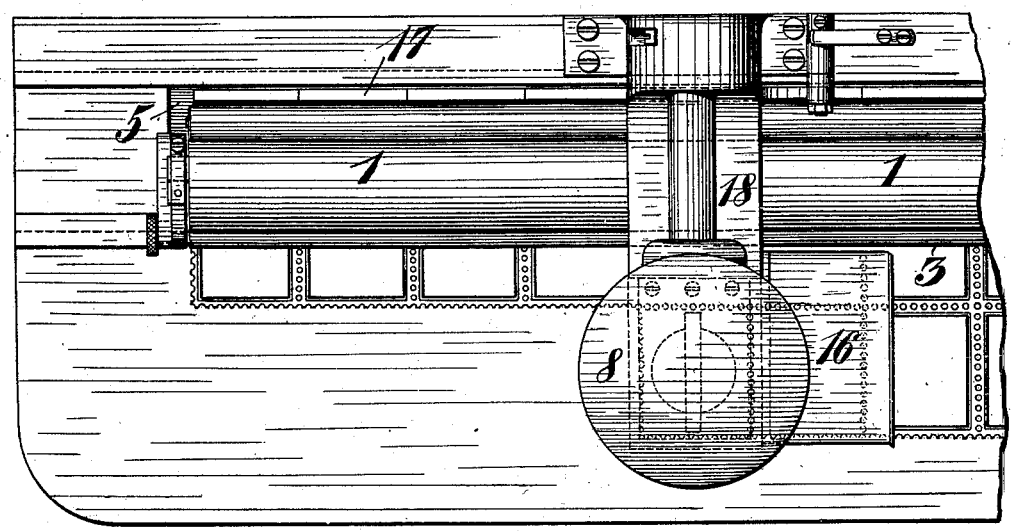
Figure 3:
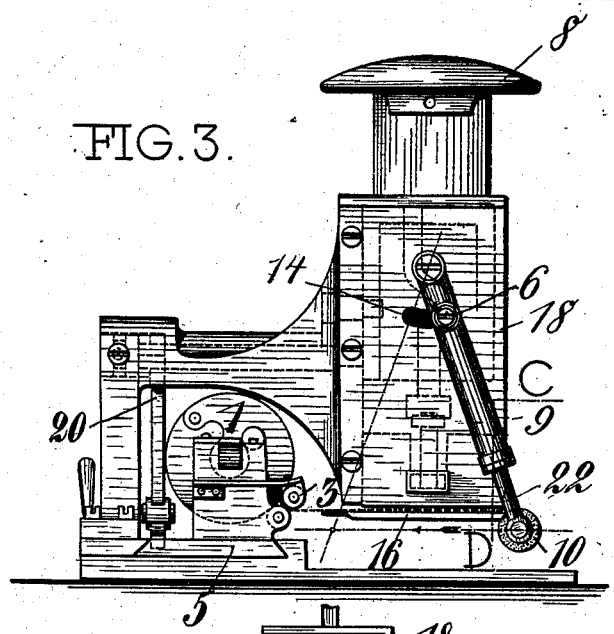
Figure 4:
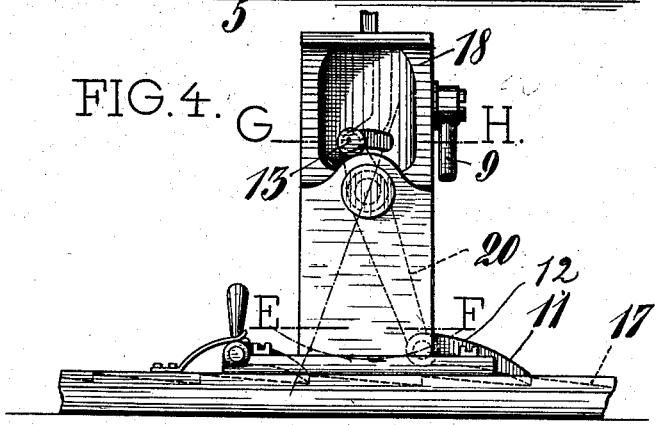
Figure 5:
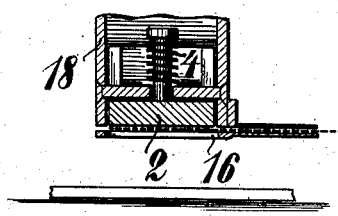
Figure 6:
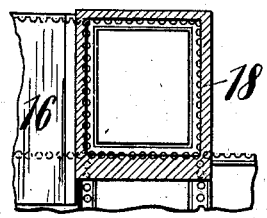
Figure 7:
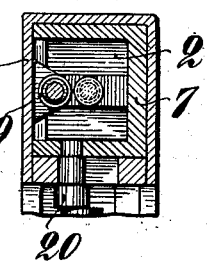

In the accompanying drawings, Figure 1 represents the apparatus as seen from the front and is in part shown in section. Fig. 2 is a plan view, and Fig. 3 is an end elevation or side view. Fig. 4 shows the mechanism which works the feed-carriage. Fig. 5 is a section on line C D, Fig. 3; Fig. 6, a section on line E F, Fig. 4; and Fig. 7, a section on line G H, Fig. 4.

The sheets of stamps, perforated in the usual manner, are rolled up and placed into a casing 1, which is supplied with a trap-lid and an opening at the bottom, through which the stamp-sheets are drawn by means of the rollers 3 in such a manner that after moving the casing containing the stamp-sheets the first row of stamps comes into such a position that they are each and individually acted upon when the stamper 2, which is influenced by a spring 4, is pressed down. The moistening of the stamps on the stamper 2 being pressed down, as well as the moving of the carriage 5, bearing the casing 1, which contains the sheets of stamps, is effected by pressing down the handle 8, with its rod 7. When the rod 7 is depressed by the handle, and so in the opposite direction of the spring 19, the stamp is moistened by the roller 10, which is saturated with water and is hung in a holder 22, telescoped by a tubular rod or lever 9. The roller 10 passes under the stamp to be affixed and moistens it or the place on the envelop. The saturating of the roller is effected by a suitable continuance; but it may also be done automatically by bringing the roller into contact with a supply apparatus after it leaves the stamp.

In order that in spite of the rotary motion of the lever 9 the roller 10 may touch and moisten equally every part of the stamp, the holder or bearing 22 of the roller-axle is made to slide in the hollow lever 9 and is held by a spring. The lever 9, which carries the roller 10, is supplied with a pin or roller 6, which through an oblique slot in the wall of the casing engages into a slot 14 of the rod or piston 7. At its top the slot is perpendicular, but has a downward inclination at its bottom, so that when the rod or piston is depressed the lever 9, with the roller 10, turns first in the direction of the arrow, Fig. 3, till the lever arrives in the position shown by the dotted line, in which position it remains while the pin 6 is in the perpendicular portion of the slot when the rod is depressed. As soon as the roller 10 arrives in the position shown by the dotted line the rod 7 strikes upon the stamper 2, carrying it downward, so that the stamp which is under it and whose edge 16 is held all round in a frame-like guide at or near the casing 18 is separated, pressed onto the envelop, and thus affixed. The return movement of the roller 10 takes place after the stamper 2 is raised. After this is done the lever 20, which is pivoted at 12 and is supplied with a catch 11 and which engages with the pin 13 into the slot 15 of the rod 7, is pulled in the direction of the arrow. Hereupon the catch 11, which engages into the teeth or cogs 17 on the carriage 5, is pushed forward. The length of the teeth corresponds with the breadth of the stamps. It will here be seen that on moving the lever 20 the carriage 5, with the casing 1, containing the stamps, is moved laterally the breadth of a single stamp, so that the next stamp is brought into position under the stamper. On the next depression of the rod after the moistening of the stamp has been effected the lever 20 first returns, so that the catch 11 drops behind the next cog.

When the first row of stamps has been used up, the next row can be pushed forward by simply turning the rollers 3, one of which is supplied with a knob.

The apparatus may also be used for sticking labels, &c., in which case the apparatus could be made larger.

What we claim is—

In an apparatus for affixing stamps, the combination of a spring-influenced stamper with a spring-influenced slotted plunger adapted to engage the same, a tubular lever having a pin that engages the slotted plunger, a holder arranged to slide in the lever, and a roller hung in the holder, substantially as specified.

Signed by us at Dusseldorf, Germany, this 3d day of December, 1902.

CARL WELTER.
THEODOR GRENZSTEIN.

Witnesses:
PETER LIEBER,
WILLIAM ESSENWEIN.